(12) United States Patent
Xu

(10) Patent No.: US 9,137,329 B2
(45) Date of Patent: Sep. 15, 2015

(54) PUSH PULL CACHING FOR SOCIAL NETWORK INFORMATION

(71) Applicant: YAHOO! INC., Sunnyvale, CA (US)

(72) Inventor: Zhichen Xu, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 14/157,867

(22) Filed: Jan. 17, 2014

(65) Prior Publication Data

US 2014/0136595 A1     May 15, 2014

Related U.S. Application Data

(63) Continuation of application No. 12/542,144, filed on Aug. 17, 2009, now Pat. No. 8,655,842.

(51) Int. Cl.
| | |
|---|---|
| *G06F 17/30* | (2006.01) |
| *H04L 29/08* | (2006.01) |
| *G06F 12/08* | (2006.01) |
| *G06Q 50/00* | (2012.01) |
| *G06F 15/76* | (2006.01) |

(52) U.S. Cl.
CPC ............ *H04L 67/32* (2013.01); *G06F 12/0868* (2013.01); *G06Q 50/01* (2013.01); *H04L 67/26* (2013.01); *H04L 67/2842* (2013.01); *H04L 67/306* (2013.01); *H04L 67/325* (2013.01); *G06F 2015/765* (2013.01)

(58) Field of Classification Search
CPC .......... G06F 12/0868; G06F 2015/765; G06F 17/30867; G06F 17/30132; G06F 17/3086
USPC .................................................. 707/628, 632
See application file for complete search history.

(56) References Cited

U.S. PATENT DOCUMENTS

| | | | |
|---|---|---|---|
| 2005/0004978 A1* | 1/2005 | Reed et al. .................... 709/203 |
| 2007/0106721 A1* | 5/2007 | Schloter ........................ 709/200 |
| 2008/0140941 A1* | 6/2008 | Dasgupta et al. ............. 711/137 |
| 2010/0274815 A1* | 10/2010 | Vanasco ........................ 707/798 |

OTHER PUBLICATIONS

Yahoo! Developer Network, "Options for using Y!OS," http://developer.yahoo.com/yos/intro/yos-options.html, Sep. 2008, 2 pages (Accessed Jul. 8, 2009).

Yahoo! Developer Network, "Overview of Y!OS," http://developer.yahoo.com/yos/intro/yos-overview.html, Sep. 2008, 3 pages (Accessed Jul. 8, 2009).

(Continued)

*Primary Examiner* — Leslie Wong
(74) *Attorney, Agent, or Firm* — James J. DeCarlo; Greenberg Traurig, LLP

(57) ABSTRACT

Embodiments are directed towards modifying a distribution of writers as either a push writer or a pull writer based on a cost model that decides for a given content reader whether it is more effective for the writer to be a pull writer or a push writer. A cache is maintained for each content reader for caching content items pushed by a push writer in the content writer's push list of writers when the content is generated. At query time, content items are pulled by the content reader based on writers a content reader's pull list. One embodiment of the cost model employs data about a previous number of requests for content items for a given writer for a number of previous blended display results of content items. When a writer is determined to be popular, mechanisms are proposed for pushing content items to a plurality of content readers.

20 Claims, 9 Drawing Sheets

(56) References Cited

OTHER PUBLICATIONS

"Cosine similarity," Wikipedia, the free encyclopedia, http://en.wikipedia.org/w/index.php? title=Cosine_similarity&printab, Jan. 17, 2007, 2 pages (Accessed Jul. 20, 2009).

"Poisson process," Wikipedia, the free encyclopedia, http://en.wikipedia.org/w/index.php? title=Poisson_process&printabl, Oct. 12, 2002, 5 pages (Accessed Jul. 17, 2009).

"Cache algorithms," Wikipedia, the free encyclopedia, http://en.wikipedia.org/w/index.php? title=Cach_algorithms&printab, Sep. 3, 2004, 4 pages (Accessed Aug. 16, 2009).

"Least frequently used," Wikipedia, the free encyclopedia, http://en.wikipedia.org/wiki/Least_Frequently_Used, Feb. 23, 2009, 1 page (Accessed Aug. 16, 2009).

Busari, M. et al., "Comparison of Cache Replacement Algorithms in Web Proxies", http://www.cs.usask.ca/faculty/carey/papers/Muda_855.doc, Jan. 29, 1999, 12 pages.

Jelenković, P.R. and Radovanović, A., "The persistent-access-caching algorithm," ACM Portal, http://portal.acm.org/citation.cfm?id=1400123.1400126, Sep. 2008, 2 pages (Accessed Jul. 8, 2009).

Yahoo! Developer Network, "What Y!OS Can Do for You," http://developer.yahoo.com/yos/intro/yos-can-do.html, Sep. 2008, 1 page (Accessed Jul. 8, 2009).

Push technology—Wikipedia, http://en.wikipedia.org/w/index.php?title=Push_technology&printable, accessed Aug. 12, 2009, 4 pgs.

Pull technology—Wikipedia, http://en.wikipedia.org/w/index.php?title=Pull_technology&printable, accessed Aug. 12, 2009, 1 page.

* cited by examiner

PUSH PULL CACHING FOR SOCIAL NETWORK INFORMATION

CROSS REFERENCE TO RELATED APPLICATIONS

This application is a continuation of, and claims priority from, co-pending U.S. patent application Ser. No. 12/542,144, filed Aug. 17, 2009, issued as U.S. Pat. No. 8,655,842 on Feb. 18, 2014 and entitled PUSH PULL CACHING FOR SOCIAL NETWORK INFORMATION, the entire contents of which are hereby incorporated by reference.

TECHNICAL FIELD

The embodiments relate generally to managing caching of social data and, more particularly, but not exclusively to employing a cost model to decide when it is effective for a given content reader to pull content and when it is more effective for a content writer to push the content for the content reader.

BACKGROUND

Recently, there has been a proliferation of social networking services. Such social networking services are typically configured to enable online communities of people who might share interests or who are interested in the interests and/or activities of others to come together. Many social network services are web based and provide a variety of ways for users to access content of interest and/or to become involved. Other social network services might be through various messaging schemes, such as instant messaging, tweets, email, RSS alerts, and so forth. Non-exhaustive examples of different social networking services, include facebook, twitter, myspace, and delicious, to name just a few.

One issue with many of these services however, arises because people may be members of so many different services. Therefore, there is often a desire to filter some of the content that may be produced by writers for a social network to reduce the amount of content that a member might receive. Filtering of content tends to provide several other benefits to a social networking service member, including providing the member with a level of trust with their social network's ties and acquaintances. Members may also benefit because they share similar interests, and therefore, they tend to learn and grow through information discovery that may arise through a diffusion of information through such networks or social circles.

While a promising idea, supporting such social networking services can be very challenging in practice. This is often because each member may have their own and very different social circle. Therefore, providing filtered content for each individual across their varying social networks may have a level of complexity of $n^2$, where n is a number of people in a given social group. In addition, different content producers or writers, may produce content at different rates, and at different times, thereby making it more difficult to ensure freshness of the filtered content. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
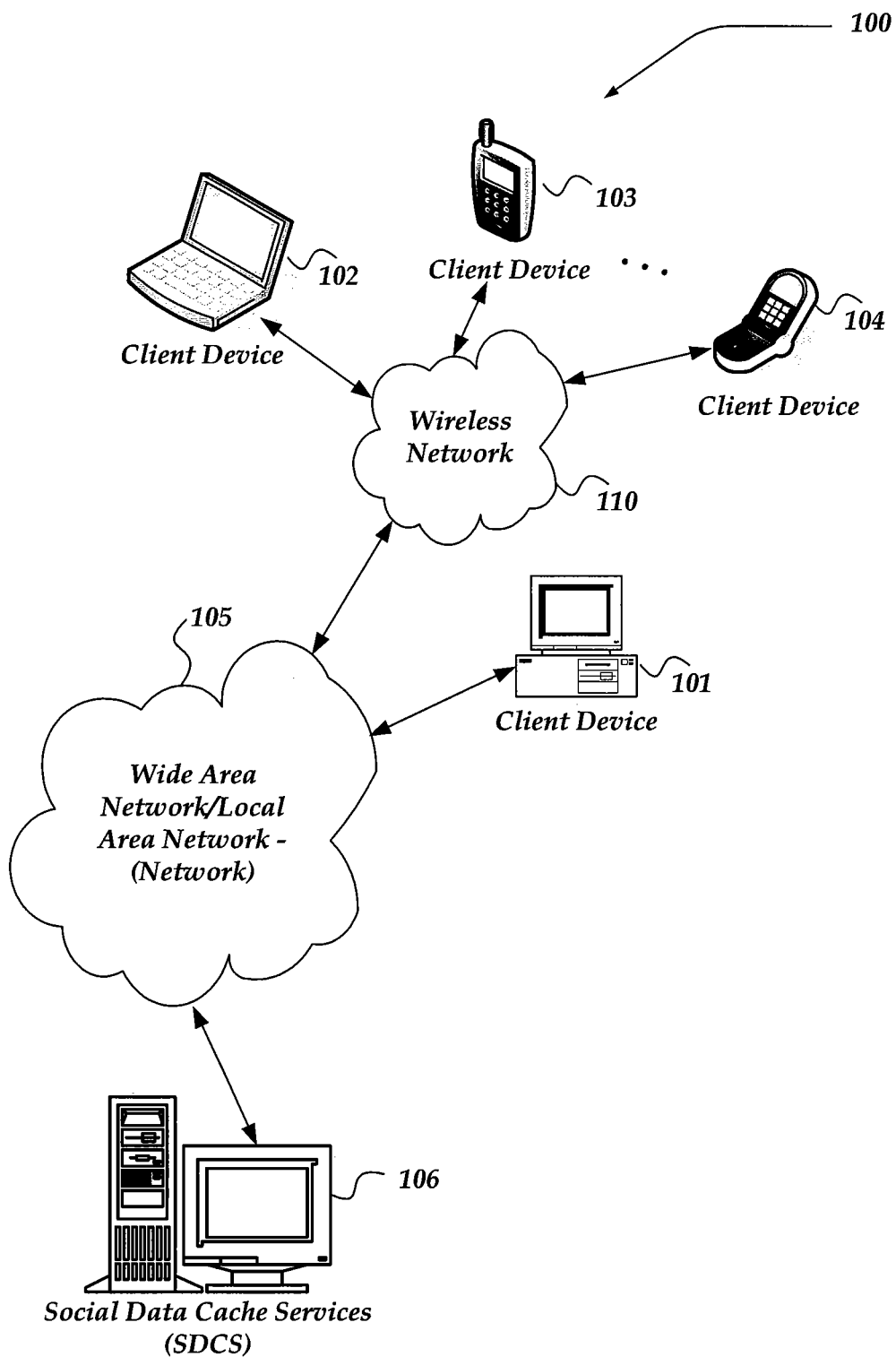
FIG. 1 is a system diagram of one embodiment of an environment in which embodiments of the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "writer" or "producer" refers to any entity that may be identified as producing content items for consumption by another entity. As used herein, the terms "reader" or "consumer" refers to any entity that may be designated as a recipient or consumer of a content item produced by a writer. Thus, a writer/producer may produce a content item, such as blog content, web article, or the like, that may then be consumed or otherwise read by a content reader/consumer. In practice, it should be noted that a particular entity might take the role of both a writer and a reader. That is, a given entity might produce content items for others to consume, while also consuming content items from others. A "friend" may refer to another entity that is identified within a social circle or network of a first entity.

Content items or content refer to any form of information that may be made available over a network by one entity to be consumed or otherwise read by another entity. Thus, content items include, but are not limited to music, articles, web postings, blog postings, RSS feeds, alerts, email, audio clips, video clips, photographs, or the like.

As used herein, the terms "push" or "push technology" refer to any of a variety of network mechanisms for use in communicating a content item wherein a request for a given transaction of the content item is initiated by a writer of the content item. It is typically referred to as the writer pushes the content item to a reader. However, such pushes may be performed by any of a variety of scripts, programs, alert mechanisms, or the like.

As used herein, the terms "pull" or "pull technology" refer to any of a variety of network communication mechanisms for communicating a content item, wherein a request for a given transaction of the content item is initiated by a reader or consumer of the content item.

As used herein, the term "cache" refers to any computer-readable storage medium useable to store digital information, such as content items. In one embodiment, as described further below, a cache might represent a designated amount of storage space or locations within the computer-readable storage medium that may be assigned for use for a specific reader, or a set of readers.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards modifying a distribution list of writers by designating the writers either as a push writer or as a pull writer based on a cost model that decides for a given content reader whether it is more effective for the writer to be a pull writer or a push writer. A cache is maintained for each content reader for caching content items pushed by a push writer in the content reader's push list of writers when the content is generated. At query time, content items are pulled by the content reader from writers in a content reader's pull list. The cached content and pulled content are then blended into a blended display result to be consumed by the reader. One embodiment of the cost model employs data about a previous number of requests for content items for a given writer for a number of previous blended display results of content items. When a writer is determined to be popular, mechanisms are proposed for pushing content items to a plurality of content readers to reduce a number of pushes.

Embodiments are directed towards optimizing resource utilization by seeking to find a balance between pushing content items to a content reader (content reader's cache) or pulling content items by the content reader. Such optimization is based on a result of a cost algorithm, and is further directed towards taking advantage of producing and consuming patterns by writers and readers.

There may be considered two perspectives on a spectrum for obtaining content items for consumption. One extreme of the spectrum is a pure pull approach, where one pulls content items produced by all producers in a consuming user's social circle or network. However, this approach often suffers from long latencies at query time. Moreover content may be pulled even though there might not be any new information produced by a given writer since a previous pull was performed. At the other extreme of the spectrum is a pure push approach, where as soon as a content item is generated, it is pushed to its consumers/readers. However, pure push approaches may waste resources because the pushed content may not be consumed by the receiving reader at all. Moreover, pure push approaches tend to result in more network traffic for those highly read or "hot" Writers.

Thus, various embodiments seek to find an optimized 'balance' between the push and the pull approach for a given reader. For each reader a cache location is maintained, sometimes called a friend cache, for use in caching content items produced by a user's social network's writers. At content generation time, content items are pushed to the cache when it is determined to be more effective for the writer to push the content items. At query time, content items are pulled from the cache as well as from some of the writers when it is determined to be more effective to pull from the writer directly.

For a given reader, a list of friends determined to be writers is used to pull content from—a pull list. A cache store that might include a memory location, or other computer-readable storage medium, is maintained to store pushed content items. Then for each writer, a list of consumers is maintained, as a push list. It may be determined that it is typically more effective to push to the reader's cache if there are more frequent pulls from the cache from more consumers. Conversely, it may be more effective to pull, if a rate of production from writer happens more frequently than a reader can pull.

This may be modeled using a cost model that lets:
Cost_push(r,w) be a cost for a writer w to push content to reader r's cache;
freq_push(r,w) be a frequency of a push;
cost_pull(r,w) be a cost to pull data produced by writer w by reader r; and
freq_pull(r) be a frequency for r to pull (e.g., consume the content item).

An effectiveness of a push may be determined as a number of times the content item ends up in a result list for a given reader, where a result list is defined as a subset of content items for a reader that may be pulled or pushed for the reader and is selected by the reader (or for the reader by an algorithm) for display to the given reader. In one embodiment, such result set is also called a blended display result set. Thus, the effectiveness may b determined as:

$$E(r,w) = \text{freq\_pull}(r)/\text{freq\_push}(r,w) \quad (1)$$

For a pure pull model, an overall cost may be determined as:

$$\text{Freq\_pull}(r) * \text{cost\_pull}(r,w) \quad (2)$$

For a pure push model, an overall cost may be determined as:

$$\text{Freq\_push}(r,w) * \text{cost\_push}(r,w) \quad (3)$$

where pulls from cache may be considered free.

Then, if w always pushes content to r, a cost savings when compared to a pull model is:

$$\text{Freq\_pull}(r) * \text{cost\_pull}(r,w) - \text{freq\_push}(r,w) * \text{cost\_push} \quad (4)$$

which essentially eliminates the pull cost, but added the push cost. From equation (4) above, it can be seen that the more frequent a pull, and the less frequent a push, a higher a cost savings. Thus, one cost model may be written as follows:

Push from writer w to reader r if the following conditions are determined to be valid:
(a) there is a cost savings
(b) the push allows a service provider to maintain a service level agreement (SLA) with a reader.

That is, a cost model seeks to maintain a latency of content item delivery or access below some time constraint based on a SLA, and maximizes a cost saving. Such model may be further constrained by a given reader's cache size, however. However, such size constraints may, in one embodiment, be modified in a next iteration, by, for example, enlarging a cache size for a particular reader. This model is described in more detail below in conjunction with FIG. 7. However, such a model may sometimes result in a requirement for a reader to maintain k timestamps for each writer w that the reader subscribes to, which might be prohibitive in some implementations. Thus, another cost model is provided.

In this other cost model, if content is pulled at time t, say from writer w, then (a) if the content item is not found in the cache of reader r, and (b) the content item is determined not to be fresh (e.g., a last update is less than a last pull), then the content writer w pushes content to cache if content is requested from the writer more than k times in the last m requests (or in a given time interval (t−b, t]), and the content item is not fresh in each of the pulls. This cost model is described in more detail below in conjunction with FIG. 8, and provides an advantage in that less state data is typically maintained over the first cost model.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, and Social Data Cache Services (SDCS) 106.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as SDCS 106, or the like. Such user account, for example, may be configured to enable the user to receive emails, send/receive IM messages, SMS messages, access selected web pages, or participates in any of a variety of other social networking activity. However, managing of messages or otherwise participating in other social activities may also be performed without logging into the user account.

In one embodiment, the user of client devices 101-104 may also be enabled to access a web page, or other user interface that enables the user to enter, select, and/or otherwise generate one or more content items, and/or to read content items. In one embodiment, a user of client devices 101-104 might maintain one or more lists usable to identify whether a content item source is a push content provider, or a pull content provider. In one embodiment, client devices 101-104 might further provide information to a content writer that indicates that the content writer is to push content for the user. For example, in one embodiment, the user might employ a mechanism that automatically subscribes and/or unsubscribes the reader to a content writer's push list of readers.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple SDCS 106, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

SDCS 106 represents any network-computing device that is configured to manage cache storage for content items for content readers, and to further manage push/pull cost modeling for readers to determine whether for a given content reader content is to be pushed by a given writer to the content reader, or pulled by the content reader. SDCS 106 further may collect various data useable to make such determinations, and to further provide changes in a content writer's status to a content writer's push list. In one embodiment, SDCS 106 might manage a writer push list that tags which readers to the writer's content are to have their content pushed to them, and which reader is to have content pulled by the reader. In one embodiment, a tag, link, or other mechanism might be employed to manage such information. However, other mechanisms may also be employed.

SDCS 106 may employ various processes including those described in more detail below in conjunction with FIGS. 7-9 for managing content item distributions within a social network.

Devices that may operate as SDCS 106 include, but are not limited to personal computers, desktop computers, multiprocessor systems, microprocessor-based or programmable consumer electronics, network PCs, servers, network appliances, and the like.

Although SDCS 106 is illustrated as a distinct network device, the invention is not so limited. For example, a plurality of network devices may be configured to perform the operational aspects of SDCS 106. For example, in one embodiment, the managing cache storage for readers might be performed by one network device, and managing push/pull effectiveness modeling might be performed by another network device. Thus, system 100 should not be construed as limiting the invention, and other system structures may be used.

Illustrative Client Environment

Figure 2:
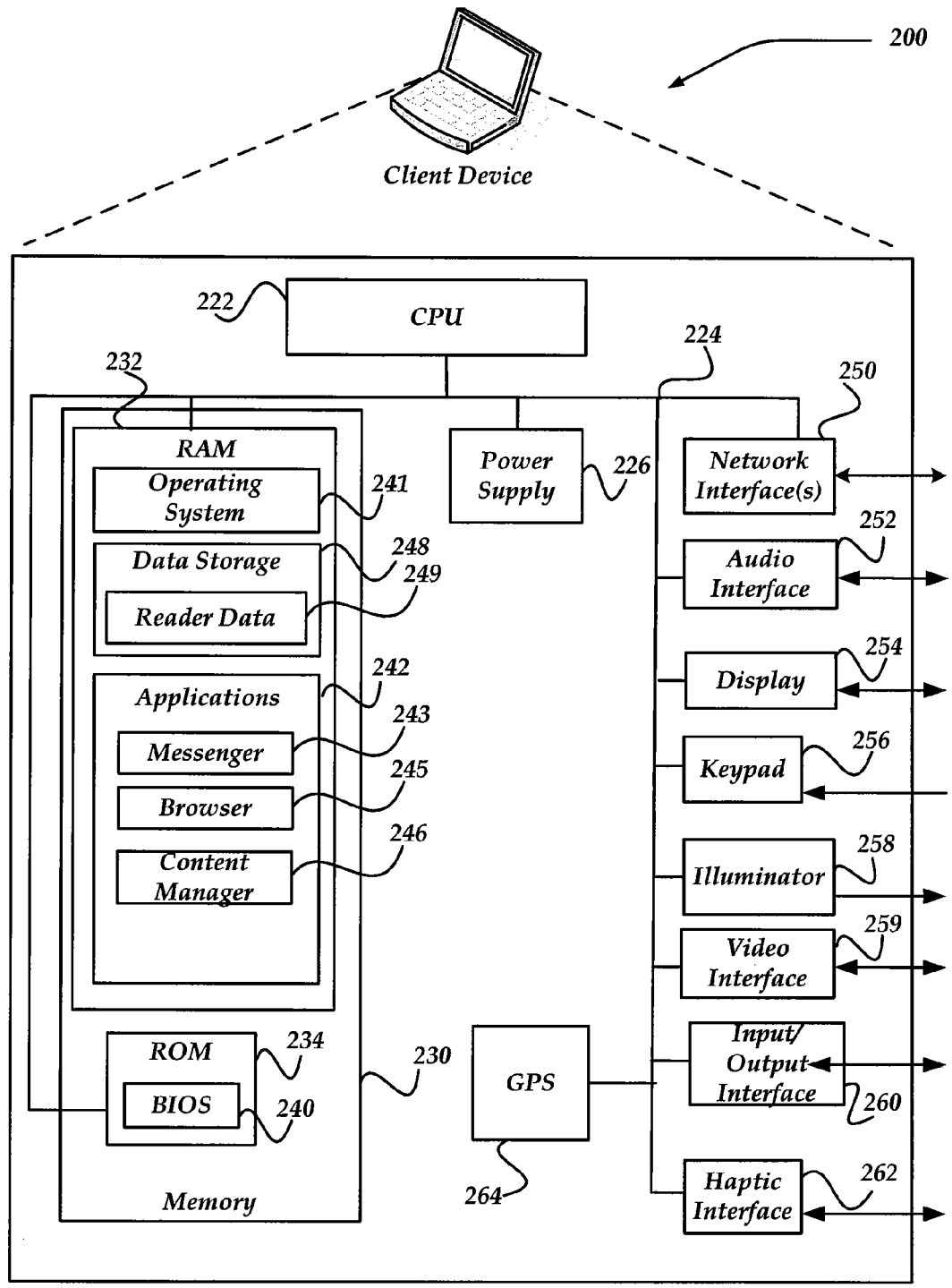
FIG. 2 shows one embodiment of a client device that may be included in a system implementing various embodiments.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, graphs, videos, or the like. Data storage 248 may further provide storage for user account information useable with one or more message accounts, social networking accounts, or the like. In one embodiment, data storage 248 may further include timestamp information about which content items are determined to be within a previous blended display result set, pull lists, push lists, friends' lists, or the like. At least a portion of the stored information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, and content manager 246.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols. In one embodiment, messenger 243 may employ various message boxes or folders to manage and/or store messages.

Content manager 246 may be configured to manage various state information for use in determining whether a given content writer should be within a push list or a pull list for a given reader. As such, content manager 246 may collect various information, and employ a cost model to determine a given effectiveness for a writer. In one embodiment, content manager 246 may further provide a communications to a given writer indicating whether the writer is in a reader's push list.

While content manager 246 is illustrated to reside within client device 200, the invention is not so constrained. For example, in another embodiment, content manager 246 might reside in whole or in part within a remote network device, such as SDCS 106 of FIG. 1.

Illustrative Network Device Environment

Figure 3:
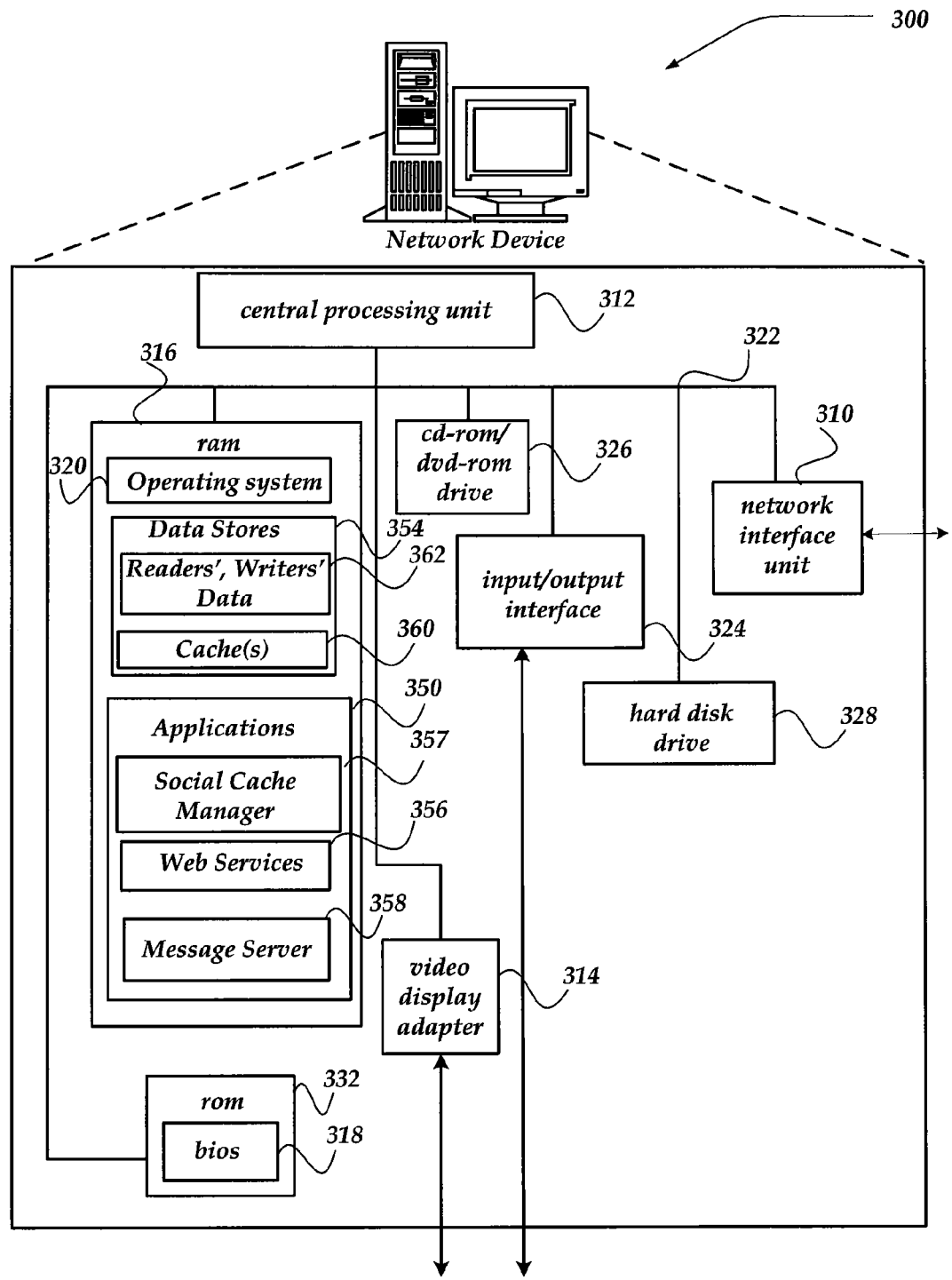
FIG. 3 shows one embodiment of a network device that may be included in a system implementing various embodiments.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, SDCS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data stores 354. Data stores 354 may be include virtually any mechanism usable for store and managing data, including but not limited to a file, a folder, a document, or an application, such as a database, spreadsheet, or the like. Data stores 354 may manage information that might include, but is not limited to web pages, account information, or the like, as well as scripts, applications, applets, and the like. For example, data stores 354 may include algorithms, and/or various parameters useable to determine cost effectiveness for a given cost model. In one embodiment, data stores 354 may further include caches 360 and readers'/writers' data 362.

Caches 360 represents one or more locations in computer-readable storage mediums that are useable to store data such as content items. In one embodiment, caches 360 represents a plurality of sub-caches (or sometimes simply "cache"), where each sub-cache may be assigned to one or more readers. In one embodiment, at least one sub-cache is designated for use by a plurality of readers based on a hotspot relief mechanism, as described in more detail below.

Readers'/writers' data 362 represents data that associated with a given reader and/or writer for use in managing push/pull effectiveness for various content readers. Thus, the data might include, but is not limited to push lists; read lists; friends' lists; reader profiles that might include such information as a reader's preferences for content, or the like. The data may further include various timestamps, as described further below, useable to determine when a content item was read, written, and/or identified within a reader's blended display result set. At least a portion of the stored information may also be stored on hard disk drive 328, cd-rom/dvd-rom 326, or other storage medium (not shown) within network device 300.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and social cache manager 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

Message server 358 may include virtually any computing component or components configured and arranged to forward messages from message user agents, and/or other message servers, or to deliver messages to a local message store, such as data stores 354, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may be managed by one or more components of message server 358. Thus, message server 358 may also be configured to manage SMS messages, IM, MMS, IRC, mIRC, or any of a variety of other message types.

Social cache manager (SCM) 357 is configured to employ a cost model, as described further below, to determine when it is effective for a given reader to pull a content item from a writer and when it is more effective to have the content item pushed by a writer. SCM 357 may further manage communications to various writers indicating whether the writer is determined to be a push writer for a given reader. In one embodiment, SCM 357 might provide such communications by associating a tag, link, or other identifier, to a reader within a writer's push list. In another embodiment, SCM 357 might add and/or delete a reader's name, address, or the like, from the writer's push list as appropriate based on the determinations.

SCM 357 might further manage hotspots that may arise because a given writer is determined to be more popular than a set of other writers. Such popularity may be based on a variety of criteria, including, but not limited to a number of readers that request content to be pushed to them from the writer; or an amount of content that a given writer produces; or the like. SCM 357 may store at least some of the data used in determining hotspots, cost effectiveness, managing push/pull lists, caches, or the like, in data stores 354. However, SCM 357 may also store at least some of its data on another network device, access at least some of the data from a client device, such as client devices 101-104 of FIG. 1, or the like.

SCM 357 might employ various processes including those described below in conjunction with FIGS. 4-5 and 7-9 to perform at least some of its actions. In one embodiment, it should be noted that at least some of the actions performed by SCM 357 might instead be performed by content manager 246 of client device 200 in FIG. 2. Thus, embodiments are not constrained to a particular configuration for where such actions may be performed, and such actions may be performed by one or more different network devices, client device, or the like, within system 100 of FIG. 1. For example, at least some of the actions may be performed using a peer-to-peer structure.

Generalized Operation

The operation of certain aspects of the invention will now be described with respect to FIGS. 4-7. Before describing various flows, it may be helpful to describe a general push/pull architecture. Thus, FIG. 6 illustrates one embodiment of a non-limiting example of content reader/writer push/pull architecture. It should be noted that architecture 600 of FIG. 6 might include more or less components than illustrated. However, the components shown are sufficient to disclose an illustrative embodiment for practicing the invention.

As shown, architecture 600 represents a single reader R1's relationship based on push/pull lists. Thus, architecture 600 shows content subscription list 602 which represents a list of content writers for which reader R1 has identified as having content items from which reader R1 may want to read. It should be noted that a writer might appear in the list based on a particular source of the content. Thus, in one embodiment, a writer might appear in the list based on a blog publication that the writer produces, for example, on food recipes, even though the writer might publish a variety of other blogs, such as animal blogs, fishing blogs, poker blogs, or the like.

In one embodiment, where a writer publishes such different blogs, the writer's name, network address, alias, website address, or other writer identifier, might appear once for each content type that the reader has identified a desire to read. In another embodiment, content subscription list 602 might be organized with the writer's identifier, followed by a list of one or more sources for content, such as the different blogs, or the like. In still another embodiment, content subscription list 602 might merely include a writer's identifier independent of a source of the content. In this embodiment, selection of which content to provide to the reader R1 might be determined based on a similarity of interests between reader R1's profile of preferences and a given content item, independent of a content source for the writer.

Based on content subscription list 602 a subset of the writers may be identified as push writers for reader R1. In one embodiment, the writers might initially be identified using virtually any mechanism, including randomly, previous statistical data for reader R1, an order subset from within content subscription list 602, or the like. In one embodiment, information indicating that a writer is within reader R1's push list 609 may be provided to each respective writer w1 610 and/or w2 611. In one embodiment, such information may be placed with a respective writer's push list 612-613 using a variety of mechanisms. Thus, in one embodiment, push list 609 might actually represent the set of information for reader R1 that is managed through the set of writers' push lists 612-613. As shown, for illustration purposes only, push list 612 identifies writer w1 610 as a push writer for reader R1, while push list 613 "identifies" writer w2 611 as a pull writer for reader R1. In one embodiment, for push list 613, such identification might be provided by a lack of a tag, link, or other identifier associated with reader R1 in push list 613.

In any event, a remaining initial set of writers from content subscription list 602 that did not become identified as push writers for reader R1 are then identified initially as pull writers. Such writers are identified within reader R1's pull list 608.

Cache 606 represents a set of computer-readable storage medium locations usable to store content items pushed by a content writer, such as w1 610, or the like. Providing content items to the reader's cache 606 may reduce query time latency.

Thus, as illustrated, for a given reader R1, various state information may be managed including push lists, and pull lists. As a cost model, as described further below, is employed, a writer may be moved from a push list 609 to a pull list 608. Thus, reader R1 may read content items from cache 606, pull content items from various writers such as writer w2 611 that may reside in pull list 608, and read content items from cache 606 that is pushed by writers, such as writer w1 610 identified in push list 609 (and/or push list 612).

Figure 4:
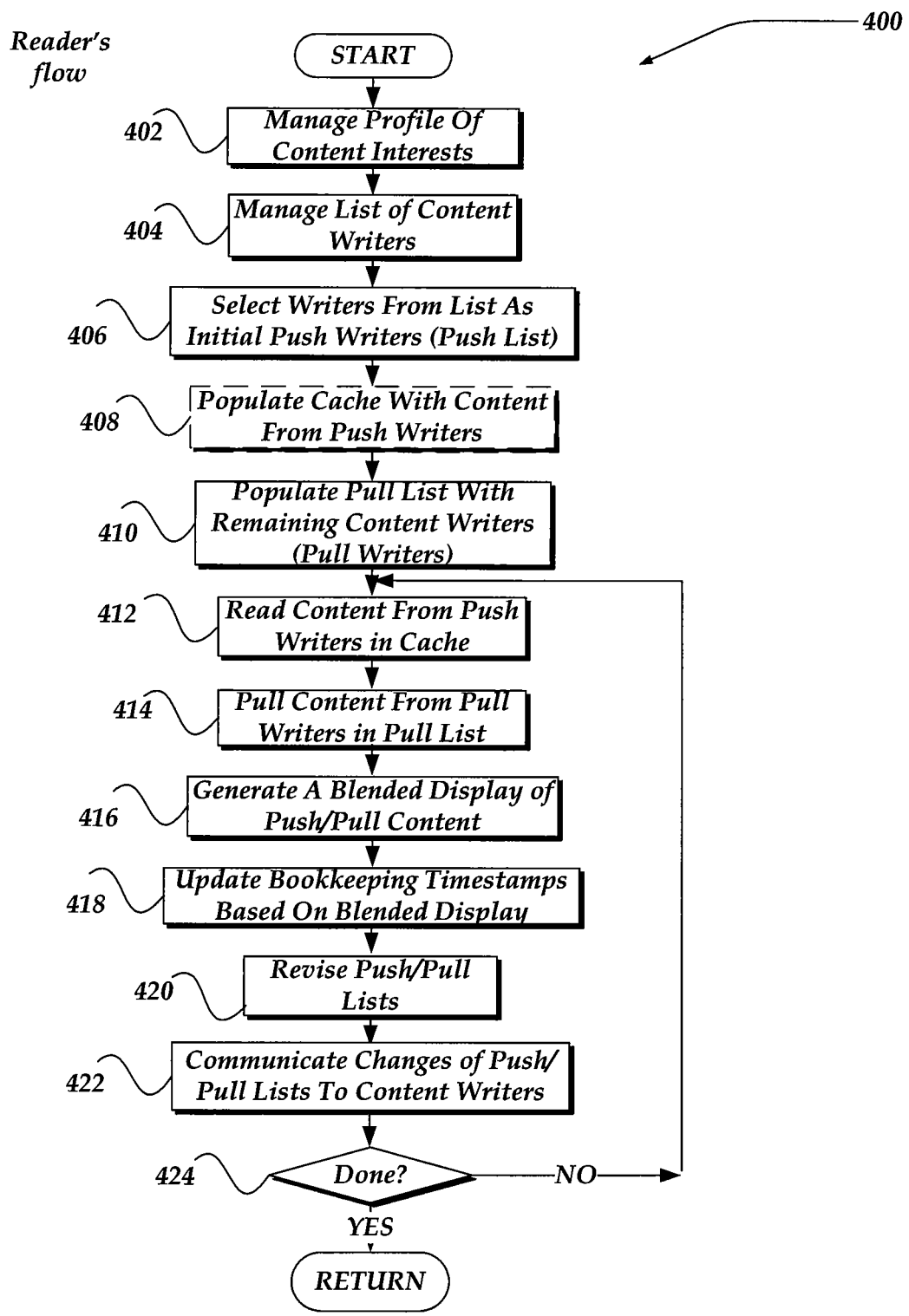
FIG. 4 illustrates a logical flow diagram generally showing one embodiment of a process for managing a content reader's content push/pull distributions.

FIG. 4 illustrates a logical flow diagram generally showing one embodiment of a process for managing a content reader's content push/pull distributions. Process 400 of FIG. 4 may represent a process useable to represent various actions performed for a given reader, such as reader R1 of FIG. 6. Process 400 may be implemented within content manager 246 of FIG. 2 and/or SCM 357 of FIG. 3.

Process 400 begins, after a start block, at block 402, where a reader may manage a reader profile. The profile may include a variety of information including information indicating what types of content items may be of preference to the reader. The preference information may be provided to the profile using checklists, survey results, historical data collected based on network actions of the reader, or any of a variety of other mechanisms. Such preference information might include, for example, a list of words, phrases, or the like, for which it is determined that the reader has a preference towards reading. In one embodiment, at block 402, the reader may make changes to their profile of preferences for content interests, virtually any time. Thus, for example, a reader might read a content item, highlight portions of the content item, and provide an indication that the highlighted portion represents an item of interest to be reflected in a change to the reader's profile. Other mechanisms are also envisaged for dynamically revising the reader's preferences.

In any event, processing flows next to block 404, where the reader manages a list of content writers. Initially, the list of content writers, or content subscription list might be generated automatically for the reader based on tracking what the reader has reader, and including in the content subscription list a writer's identifier based on the tracked information. In another embodiment, the content subscription list might be generated by the reader selecting writer's to be included. In still another embodiment, the content subscription list may be generated by extracting writer identifiers from a various buddy lists, social network group lists, email lists, address book information, or the like, associated with the reader.

Processing continues to block 406, where the reader, or through various other mechanisms, writers are selected from the content subscription list and placed into an initial push list of writers. Flowing next to block 408, cache for the reader may be populated with content items from the identified push writers. In one embodiment, blocks 406 and 408 might be revised. For example, block 408 might instead operate to fill cache with content items from various writers within the reader's content subscription list. Then, once the cache is full, the list of writers associated with the content items within the cache may be used to generate the push list of writers. Thus, as may be seen, generation of the initial push list may be performed using a variety of mechanisms, and the invention is not constrained to a particular mechanism.

Process 400 then flows to block 410, where the reader's pull list is populated based on the list of writers in the content subscription list that are not initially identified in the reader's push list.

Moving next to block 412, content items are read from the reader's cache. Such content items may be placed in the reader's cache by the content writer's performing a push to the reader's cache, or other cache for which the reader has access.

Process 400 continues next to block 414, where the reader pulls content items from writers identified in the reader's pull list. Flowing next to block 416, a reader may generate a blended display result set of push/pull content items. Because a reader may have more content items to read than might be displayable within a single computer display screen, the reader is encouraged to generate a sorted list of content items for display. This sorted list may then be used to generate the blended display result set. For example, where a computer screen for the reader is configured to display 10-20 content items, then the blended display result set might consist of the first (highest ordered) set of content items in the reader's sorted list.

Processing flows next to block 418, where various book-keeping activities are then performed that may involve, for example, maintaining timestamps for each content item within the reader's blended display result set. In one embodiment, such timestamp information might be saved for over a previous m number of blended display result sets. For example, in one embodiment, process 400 might maintain k timestamps for each writer for which the reader subscribes to. In another embodiment, process 400 might save over a previous m number of requests for content, whether a writer's content item has been identified in the reader's previous n number of blended display result set.

In any event, processing then flows to block 420 where a modification to the reader's push list and pull lists may be performed using a cost model that determines when it is effective to pull a writer's content and when it is more effective to push a writer's content. While several different cost models may be used, two different cost models are described in more detail below in conjunction with FIGS. 7-8.

In any event, flowing next to block 422, the changes to the push list and pull lists may be communicated to affected content writers. Thus, in one embodiment, where a content writer did not change lists, no communication might be sent to the content writer. Processing then flows to decision block 424, where a determination is made whether the reader is done. If so, processing may return to a calling process to perform other actions. However, if the reader selects to continue process 400, then processing may loop back to block 412. However, as noted above, block 402 may be performed virtually at any time. Furthermore, a reader may at any time delete a writer from one or more lists, add a new writer to a list, or the like, independent of process 400.

Figure 5:
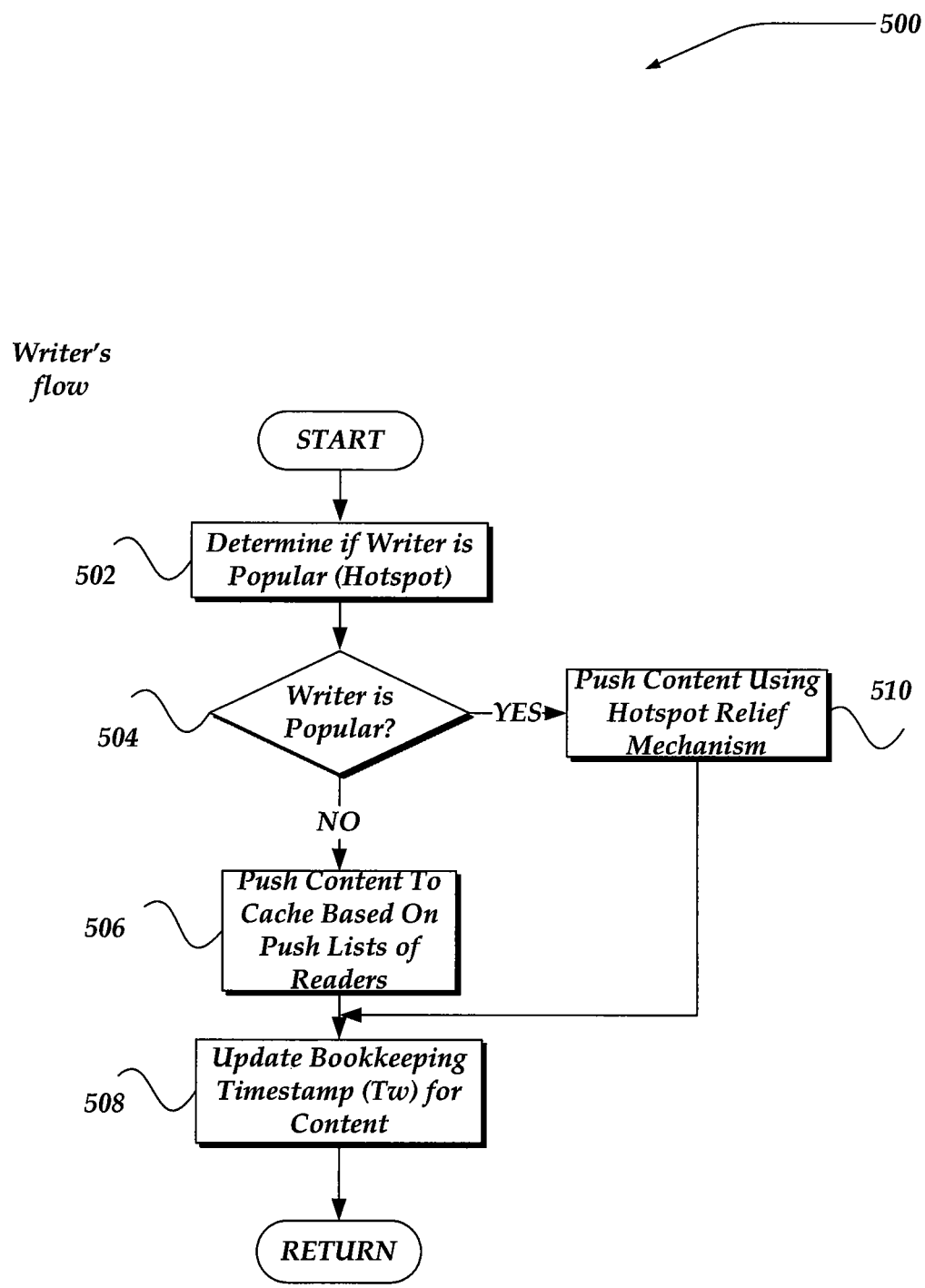
FIG. 5 illustrates a logical flow diagram generally showing one embodiment of a process for managing a content writer's content push/pull distributions.
Figure 6:
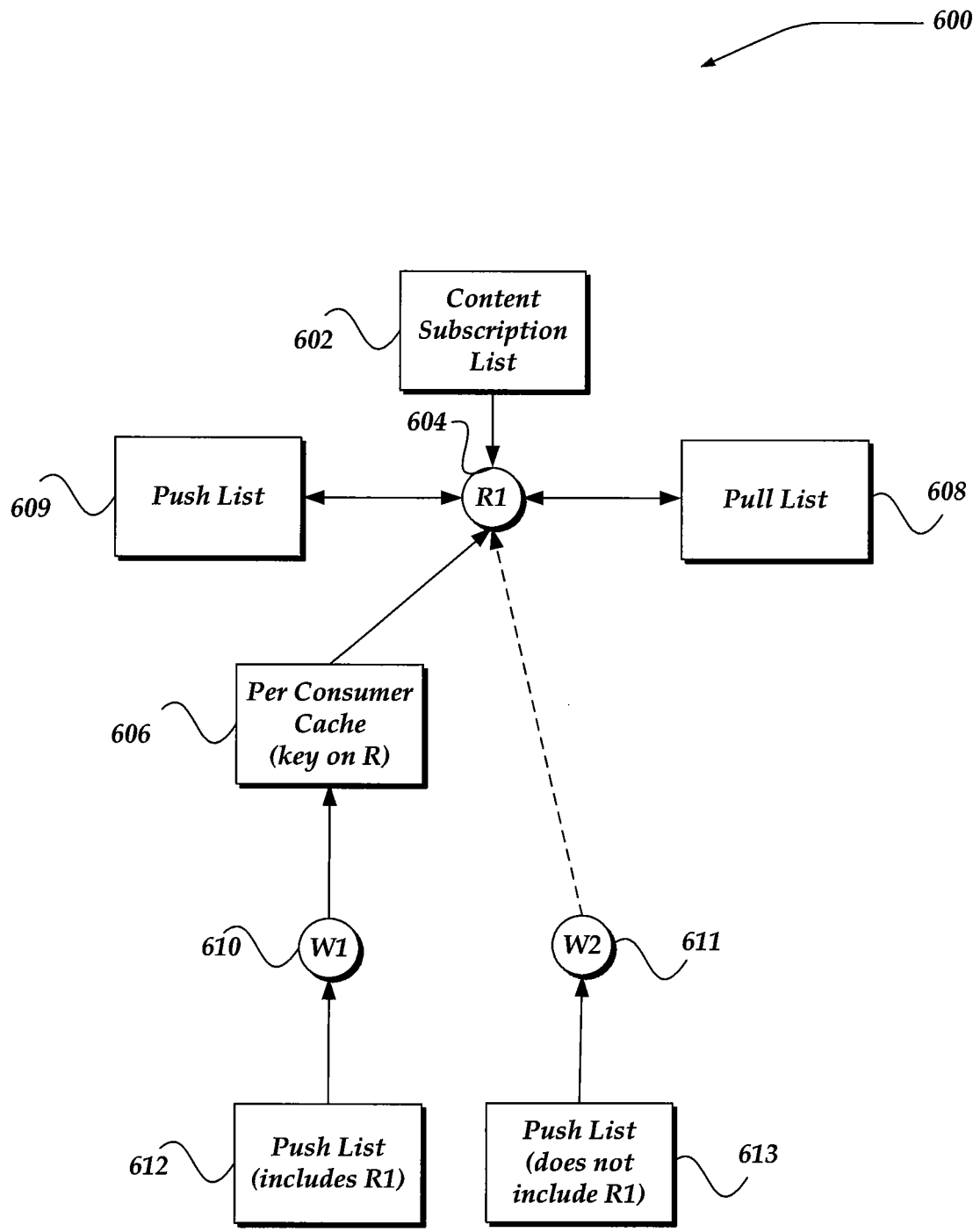
FIG. 6 illustrates one embodiment of a non-limiting example of content reader/writer push/pull architecture.

FIG. 5 illustrates a logical flow diagram generally showing one embodiment of a process for managing a content writer's content push/pull distributions. Thus, process 500 of FIG. 5 may be performed for each writer of content items. Process 500 may be implemented within content manager 246 of FIG. 2 and/or SCM 357 of FIG. 3.

Processing begins, after a start block, at block 502, where a determination is made whether a writer is determined to a popular. Because some writers are popular, there may be a large number of readers that may seek to access the writer's content items. Such popularity may sometimes result in hotspots that affect network traffic, latency issues, or the like. Where the writer is a push writer for a large number of readers, some security filters, spam filters, or the like, might prevent the writer's content from being available to some readers. Thus, various approaches to such hotspots are provided. A determination of whether a writer is popular, and therefore may create a hotspot may be based on a variety of criteria, including, a number of readers that request the writer to push content to them, a frequency of times the writer might push content items, or the like. For example, if a number of readers exceeds some multiple of readers beyond a median, mean, or other metric, for other writers, then the writer may be defined as a popular (hot) writer. Similarly, if the writer produces content items at a rate that is some ratio higher than a mean, median, of other measure of other writers, then the writer might be defined as a popular (hot) writer. Other criteria, however, may also be used. In any event, at block 502, a determination is made whether the writer is popular. Then flowing to decision block 504, if the writer is determined to be popular, processing flows to block 510; otherwise, processing flows to block 506.

At block 510, various hotspot relief mechanisms may be employed to minimize a likelihood of network traffic issues. For example, in one embodiment, a shared cache might be introduced that is available to a plurality of content readers. The popular writer may then push content items to the shared cache rather than to individual reader's cache. In this manner, network traffic may be reduced because the popular writer pushed might push to one shared cache instead of the plurality of cache locations. In another embodiment, however, the hotspot relief mechanism might include having the writer push a content item employing a multicast protocol to push the content item to a plurality of different content readers. In any event, a combination of these relief mechanisms may also be employed, as well as any of a variety of other mechanisms. Processing then flows to block 508.

At block 506, where the writer is determined not to be a popular writer, the writer may push content items to each reader's cache for which the writer is designated as a push writer for that reader. Processing then flows to block 508.

At block 508, various bookkeeping information may be stored for this writer. For example, in one embodiment a timestamp tw might be stored for each content item that the writer pushes. In another embodiment, a last m timestamps might be saved for each time the writer produces new content. In any event, processing then returns to a calling process to perform other actions.

Figure 7:
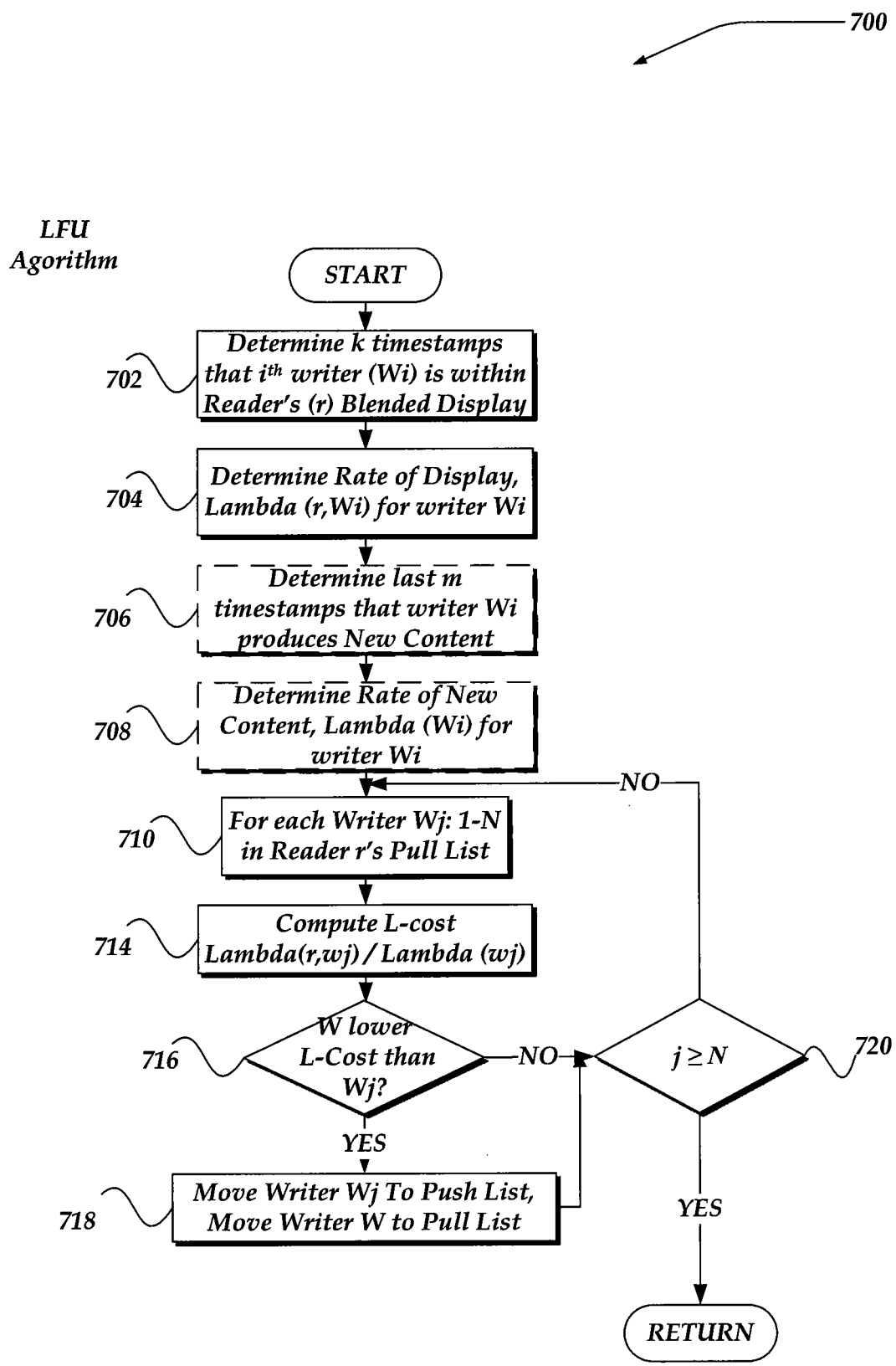
FIG. 7 illustrates a logical flow diagram generally showing one embodiment of a process for a first cost model for use in determining a push/pull writer distribution.
Figure 8:
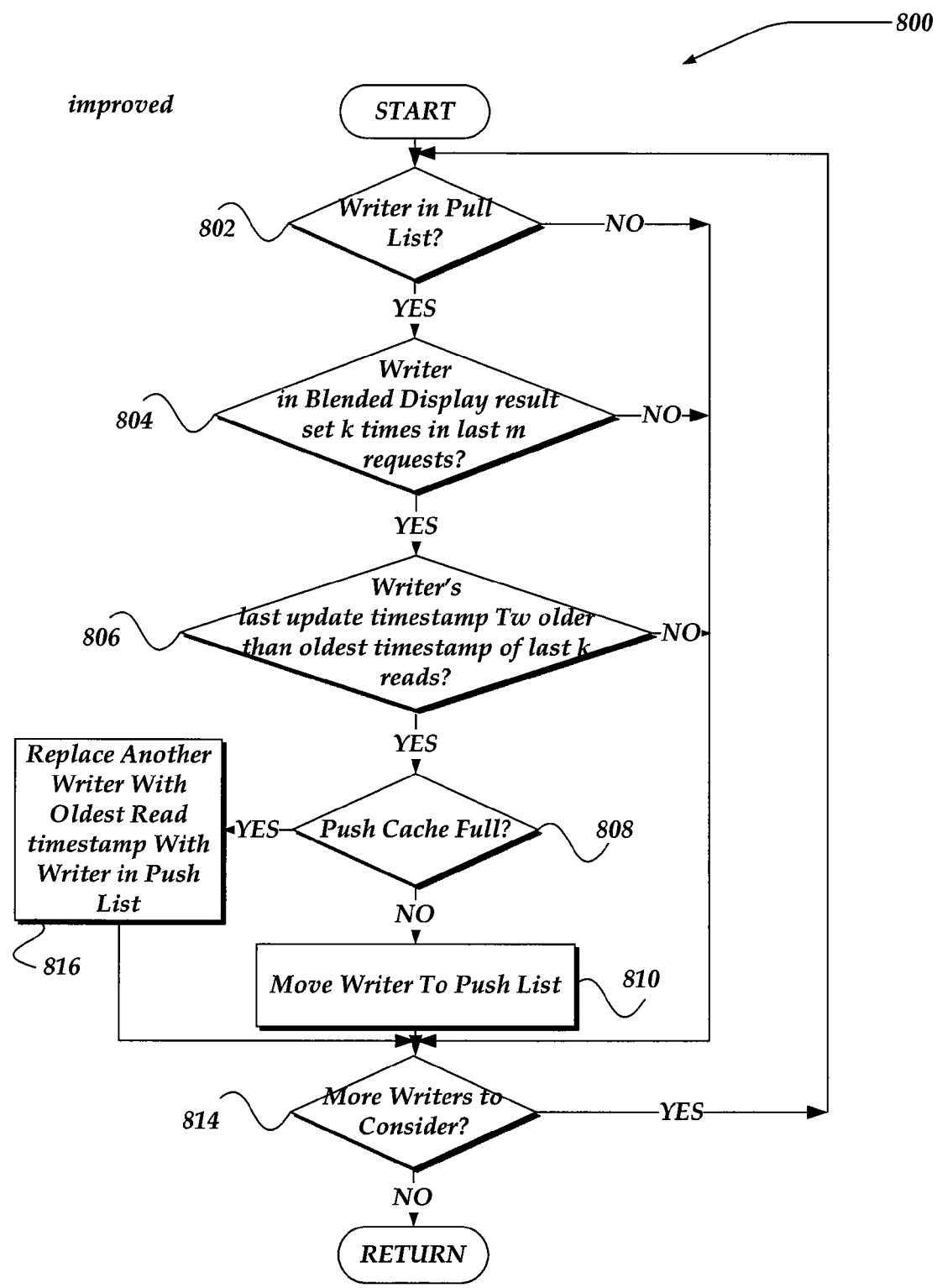
FIG. 8 illustrates a logical flow diagram generally showing one embodiment of a process for a second cost model for use in determining another push/pull writer distribution.

FIG. 7 illustrates a logical flow diagram generally showing one embodiment of a process for a first cost model for use in determining a push/pull writer distribution. Process 700 of FIG. 7 represents one embodiment of a cost model that may be employed within block 420 of FIG. 4 to revise a reader's push list and pull lists. Briefly, the cost model of process 700 employs information for a given reader. For example, for the reader, k timestamps in which an ith writer's content item ends up in the reader's blended display results set is maintained. For a writer, a last m timestamps may be employed for when the ith writer produces new content. Then using various estimated rate data, a replacement policy is employed where, when a first writer (wi) is missed (is in the reader's pull list), a cost savings is determined based on a ratio of an estimated rate that the first writer's content ends up in the content reader's blended results set to an estimated rate that the first writer produces a new content item. Then, if a second cost savings associated with a second writer w, is greater than the first cost savings, the second writer is placed into the reader's push list, and the first writer is placed into the reader's pull list.

As shown, process 700 then, begins, after a start block, at block 702, where a k number of timestamps is determined for when the ith writer (Wi)'s content is within the reader's (r) blended display result set. Continuing to block 704, an estimated rate of display lambda (r, Wi) is determined for writer Wi. Any of a variety of mechanisms may be used to estimate the rate of display lambda (r,Wi). For example, in one embodiment, it can be assumed that the process of having the writer Wi's content occurring within a reader's blended display result set may be modeled using a homogenous Poisson process. Then, using a maximum likelihood approach for a given sample of n measured values ki, an estimate of the rate may be determined as:

Lambda=$(1/n)\Sigma ki$, where $i-1-n$.

Processing moves next to block 706, where a last m timestamps for when writer Wi produces new content is determined. Continuing to block 708, then a rate of new content production for writer is determined using the above lambda equation for writer Wi.

Processing continues to block 710, where for each writer Wj: from 1–N in a reader's pull list, processing flows to block 714, where a cost savings estimate is determined as:

Lambda$(r, Wj)$/lambda$(Wj)$

Cost savings as described herein may also be viewed as an "effectiveness" of having Wj do a push of a content item. Thus, such cost savings and effectiveness may be used interchangeably. As described then, the above represents an estimated number of times that content pushed by Wj ends up in reader r's blended display set.

Restated, the process determines an estimated rate of a first writer's content item is in a defined number of previous blended display results. The process further determines an estimated rate of a second writer's content item is in a defined number of previous blended display results. The process further determines an estimated rate that the first writer produces a new content item, and an estimated rate that the second writer produces a new content item. Then, when the first writer is determined to be in the content reader's pull list, a first cost savings is determined based on a ratio of the estimated rate that the first writer's content ends up in the content reader's blended result set to the estimated rate that the first writer produces a new content item. Further, a second cost savings based on a ratio of the estimated rate that the second writer's content ends in the content reader's blended results set to the estimated rate that the second writer produces a new content item.

Flowing next to decision block 716, a determination is made whether the second cost savings is greater than first cost (or the first cost savings is less than the second cost savings). If so, processing flows to block 718, then the second writer is placed into the reader's push list, and the first writer is placed into the reader's pull list. Processing then flows to decision block 720 to determine whether the complete set of writers in the reader's pull list has been reviewed (j≥N, where N is the number of writers in the reader's pull list). If so, then processing returns to a calling process. Otherwise, processing loops back to block 710 to continue evaluating writers.

As noted above, the invention is not limited to the cost model described above for determining effectiveness, and others may be used. For example, in another embodiment, process 800 of FIG. 8 may also be used. Thus, FIG. 8 illustrates a logical flow diagram generally showing one embodiment of a process for a second cost model for use in determining another push/pull writer distribution.

Briefly, process 800 provides that for a reader r, a writer W is designated to push content to the reader's cache if W is determined to have been missed (not in the reader's cache and was in the reader's pull list); writer W is determined to be in the reader's blended display result set k times in a previous m times (previous m blended display result sets); and further that writer W's last update timestamp tw is older than an oldest timestamp of the last k reads by the reader (that is, the same data from W was read multiple times). Process 800 provides that for a given reader that, for a last m requests, information be maintained about timestamps for when a writer is in the reader's blended display results. For the writer, the last update timestamp is maintained. Thus, process 800 may require less state data to be maintained than process 700 of FIG. 7.

In any event, process 800 begins, after a start block, at decision block 802, where a determination is made whether a writer is in the reader's pull list. If not, then processing flows to decision block 814, to determine whether there are any more writers to consider for this reader. Otherwise, processing flows to decision block 804, where a determination is made whether a content item of the writer is identified k times in a previous m number of last blended display results (requests for content). If so, processing flows to decision block 806; otherwise, processing branches to decision block 814.

At decision block 806, a determination is made whether the writer's last provided content item has a timestamp tw that is older than an oldest timestamp in the previous k number of blended display results. If so, then processing flows to decision block 808; otherwise, processing branches to decision block 814. (writer has no new content in the last k reads from the reader.) In one embodiment, in block 806, the condition may also be modified such to determine instead, whether the last update timestamp Tw is older than the oldest timestamp of the last j reads (where j is ≤k). At decision block 808, a determination is made whether the push cache is full for the reader. That is, optionally, decision block 808 might determine that there are too many push writers for this particular reader given the reader's cache size. If it is determined that the push cache is full, processing flows to block 816; otherwise, processing flows to block 810. At block 816, in one embodiment, one of an older writer that is in the reader's push list and that was read least number of times in the last m requests might be moved to the reader's pull list. In another embodiment, a writer that is a writer in the reader's push list with an oldest read timestamp might be moved to the reader's pull list, to accommodate the current writer. In another embodiment, whether than moving out older writers, the reader's cache may instead by enlarged. In any event, processing then flows to decision block 814.

At block 810, the writer is moved to the reader's push list. Processing then flows to decision block 814, where a determination is made whether there are more writers to consider for this reader. If so, processing loops back to decision block 802; otherwise, processing returns to a calling process.

In the above process 800, m is typically greater to or equal to k, with m and k typically being fixed, in one embodiment.

In one embodiment, m is between about 25-35, and k is between about 2-4. In one embodiment, m=30, k=3, and j=3. However, other values of m, k, and/or j may also be selected.

Figure 9:
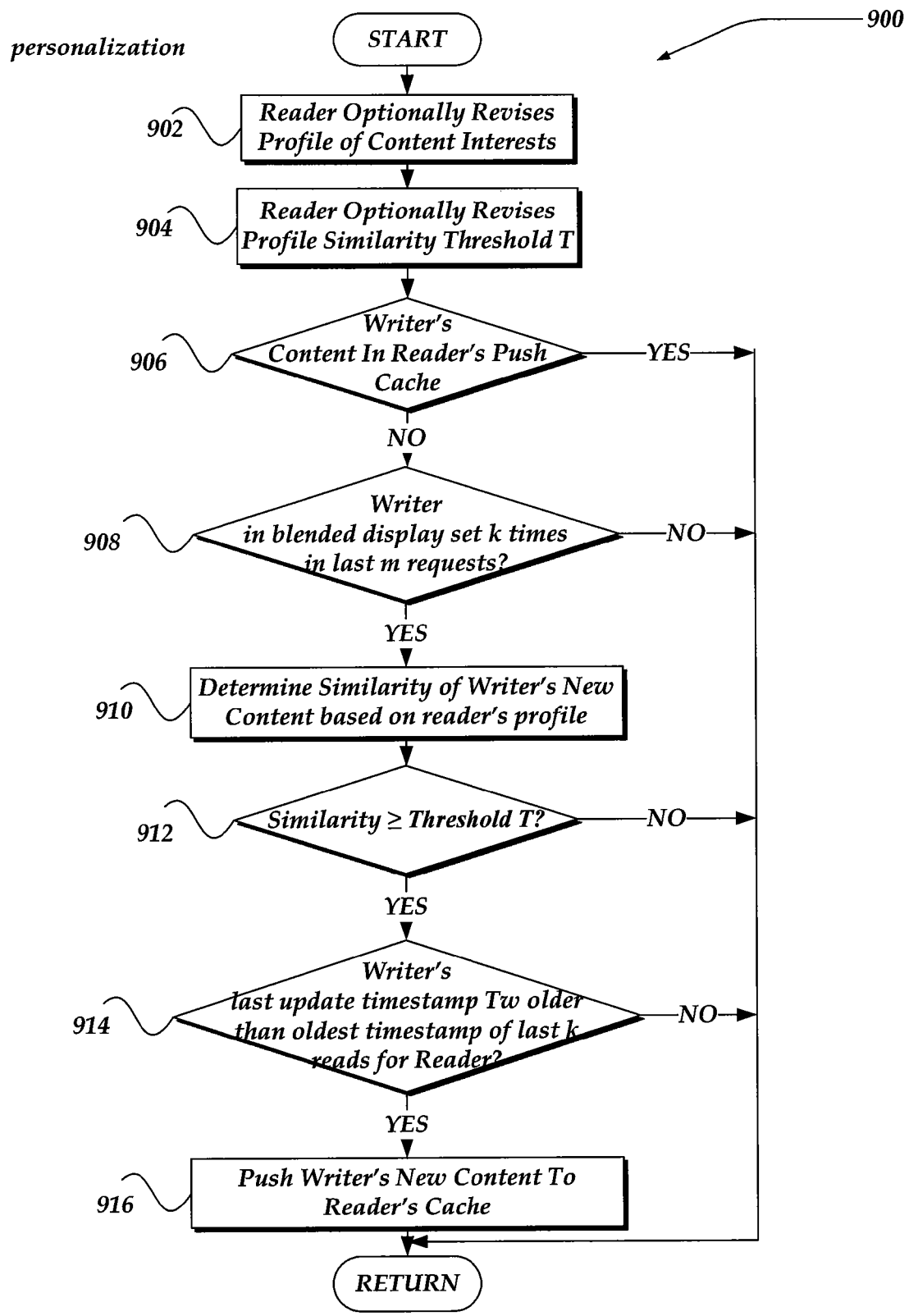
FIG. 9 illustrates a logical flow diagram generally showing one embodiment of a process for managing a personalization of a push/pull writer distribution.

FIG. 9 illustrates a logical flow diagram generally showing one embodiment of a process for managing a personalization of a push/pull writer distribution. A further modification to the above cost models for determining whether a writer is a push writer or a pull writer for a given reader may include personalizations. For example, although a given writer might provide push a content item, not all of the content items being pushed might be of personal interest to the reader. Thus, in one embodiment, for a given content item for a writer, a determination might be made using the reader's profile of preferences to determine whether a writer's content item has a similarity of content to the reader's profile that is above a defined threshold. In one embodiment, such personalization may be employed to further determine whether a writer's content is to be pushed to the reader's cache.

Thus, as shown, process 900 of FIG. 9 begins, after a start block, at block 902, where a reader might optionally revise their profile of content interests, similar to is described above in conjunction with block 402 of FIG. 4.

Processing continues to block 904, where the reader may further generate and/or optionally modify a similarity threshold T. Such values of T may range, in one embodiment, from zero indicating that any content would be viewed as being similar to one meaning that the content item should be exactly the same to the reader's profile of content interests.

Process 900 flows next to decision block 906, where a determination is made whether the writer's content is to be placed into the reader's push cache. That is, is the writer a push write or pull writer? If the writer is a push writer, then processing may return to a calling process; otherwise, if the writer is a pull writer, processing flows to decision block 908.

At decision block 908, a determination is made whether the writer's content has been placed into the reader's blended display results k times in the previous m blended display result sets (or content requests). If not, then processing returns to a calling process; otherwise, processing flows to block 910.

At block 910, a similarity value is determined for the writer's new content based on the reader's profile. Any of a variety of mechanisms may be used to determine similarity of content. For example, in one embodiment, a cosine similarity might be used, or even a Tanimoto coefficient. That is:

$$\text{Similarity} = T(A,B) = (A \cdot B)/(\|A\|^2 + \|B\|^2 - (A \cdot B))$$

Where A represents the reader's content profile, and B represents the content characteristics of the writer's new content item. Then, flowing to decision block 912, a determination is made whether the determined similarity is at or above the reader's similarity Threshold T. If it is, processing flows to decision block 914; otherwise, processing returns to a calling process.

At decision block 914, a determination is made whether the writer's last update timestamp tw for the content item of interest is older than the oldest timestamp of a last j (where j is ≤k) reads of content by the reader. If so, processing flows to block 916; otherwise, processing returns to a calling process.

At block 916, the writer pushes the new content item to the reader's cache. In one embodiment, the writer may also be moved from a pull list to a push list for the reader. Processing then returns to a calling process.

In one embodiment, the above similarity evaluation may be performed for any writer that is currently in the reader's push list. Thus, for example, if the writer is designated as a push writer, and the similarity for new content from the writer is at or above the threshold T, then the writer pushes the content item to the reader's cache.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
   providing content items to a content reader from a content reader's push cache, wherein at least one content writer in a content reader's push list of writers pushes at least one content item to the content reader's push cache;
   receiving a pull request to read at least one content item from at least one content writer in a content reader's pull list of writers;
   receiving a request for display of a combination of a subset of the provided content items from the push cache and from at least another content item pulled in response to the received pull request, the combination being a blended display result;
   employing a cost model personalized for the content reader to determine each writer of a content item that is included in the blended display result and to modify the push list of writers and pull list of writers by moving the at least one determined writer from one of the push list or pull list to the other of the pull list or the push list, wherein the personalized cost model is further employed to make a determination to move a content writer from the pull list to the push list if a similarity of content between the writer's content item and a content reader's profile is above a defined threshold; and providing information to the at least one determined writer based on the personalized cost model indicating that the writer is to push a content item for the content reader.

2. The method of claim 1, the method further comprising:
determining an estimated rate that a first writer's content item is in a defined number of previous blended display results for the content reader;
determining an estimated rate that a second writer's content item is in a defined number of previous blended display results for the content reader;
determining an estimated rate that the first writer produces a new content item;
determining an estimated rate that the second writer produces a new content item;
when the first writer is determined to be in the content reader's pull list:
using the personalized cost model to compute a first cost saving based on a ratio of the estimated rate that a first writer's content is in a defined number of previous blended display results for the content reader to the estimated rate that the first writer produces a new content item;
using the personalized cost model to compute a second cost saving based on a ratio of the estimated rate that a second writer's content is in a defined number of previous blended display results for the content reader to the estimated rate that the second writer produces a new content item; and
if the second cost saving is more than first cost saving, placing the second writer into the push list and the first writer into the pull list.

3. The method of claim 1, the method further comprising:
for each writer in the pull list that has a content item identified k times in a previous m number of blended display results:
determining whether the writer last provided a content item having a timestamp tw that is older than an oldest timestamp in the previous j number of blended display results for j less than or equal to k, and if it is moving the writer into the push list.

4. The method of claim 1, the further comprising:
determining whether a writer in a push list is a popular writer based in part on a number of other content readers to which the writer is to push content items; and
if the writer is determined to be a popular writer, allowing the writer to push a content item to a shared cache useable by a plurality of different content readers.

5. The method of claim 1 further comprising:
determining whether a writer in a push list is a popular writer based in part on a number of other content readers to which the writer is to push content items; and
if the writer is determined to be a popular writer, using a multicast protocol to push a content item of the writer to a plurality of different content readers.

6. The method of claim 1, the method further comprising:
for a writer not having a content item in the content reader's push cache but having a content item k times in a previous m number of blended display results, determining whether the writer last provided a content item having a timestamp tw that is older than an oldest timestamp in the previous j blended display results for j less than or equal to k, and if it is moving the writer into the push list.

7. A computer readable non-transitory storage medium for tangibly storing thereon computer readable instructions that when executed cause at least one processor to:
receive a request for content items in a content reader's push cache, wherein at least one content writer in the content reader's push list of writers pushes at least one content item to the content reader's push cache, the content reader's push list designating writer's to push content to a content reader's push cache;
receive a pull request to read at least one content item from at least one content writer in the content reader's pull list of writers, the content reader's pull list designating writers for which the content reader pulls content items;
receive a request for display of a combination of a subset of the provided content items from the push cache and from at least another content item pulled in response to the received pull request, the combination being a blended display result;
employ a cost model personalized for the content reader to determine each writer of a content item that is included in the blended display result and to modify the push list of writers and pull list of writers by moving the at least one determined writer from one of the push list or pull list to the other of the pull list or the push list, wherein the personalized cost model is further employed to make a determination to move a content writer from the pull list to the push list if a similarity of content between the at least one determined writer's content item and a content reader's profile is above a defined threshold.

8. The computer readable non-transitory storage medium of claim 7, the instructions further comprising instructions to:
determine an estimated rate that a first writer's content item is in a defined number of previous blended display results;
determine an estimated rate that a second writer's content item is in a defined number of previous blended display results;
determine an estimated rate that the first writer produces a new content item;
determine an estimated rate that the second writer produces a new content item;
when the first writer is determined to be in the content reader's pull list, using the personalized cost model to:
use the personalized cost model to compute a first cost saving based on a ratio of the estimated rate that the first writer's content ends up in the blended display for the content reader to the estimated rate that the first writer produces a new content item;
use the personalized cost model to compute a second cost saving based on a ratio of the estimated rate that the second writer's content ends up in blended display set for the content reader to the estimated rate that the second writer produces a new content item; and
if the second cost saving is greater than first cost saving, placing the second writer into the push list and the first writer into the pull list.

9. The computer readable non-transitory storage medium of claim 7, the instructions further comprising instructions to:
for each writer in the pull list that has a content item identified k times in a previous m number of blended display results:
determine whether the writer last provided a content item having a timestamp tw that is older than an oldest timestamp in the previous j number of blended display results for j less than or equal to k, and if it is move the writer into the push list.

10. The computer readable non-transitory storage medium of claim 9, the instructions further comprising instructions to:
for each writer in the push list, push a content item to the content reader if the content item has a similarity with a content profile of the content reader that is equal to or above a content threshold.

11. The computer readable non-transitory storage medium of claim 7, the instructions further comprising instructions to:
   determine whether a writer in a push list is a popular writer based in part on a number of other content readers to which the writer is to push content items; and
   if the writer is determined to be a popular writer, making the writer's content item available to a plurality of different content readers using one of a shared cache to which the writer's content item is pushed or a multicast protocol to push the content item to the plurality of different content readers.

12. The computer readable non-transitory storage medium of claim 7, the instructions further comprising instructions to:
   for a writer not having a content item in the content reader's push cache but having a content item k times in a previous m number of blended display results, determine whether the writer last provided a content item having a timestamp tw that is older than an oldest timestamp in the previous j number of blended display results for j less than or equal to k, and if it is moving the writer into the push list.

13. The computer readable non-transitory storage medium of claim 7, the instructions further comprising instructions to:
   provide information to at least one writer indicating that the writer is identified within the content reader's push list such that the writer is designated to push at least one content item for the content reader.

14. A system comprising:
   at least one computing device, each computing device comprising one or more processors and a storage medium for tangibly storing thereon program logic for execution by the processor, the stored program logic comprising:
      storing logic executed by the one or more processors for storing at least one push cache having at least one content item pushed by a content writer for a content reader;
      providing logic executed by the one or more processors for providing content items to the content reader from the content reader's push cache;
      receiving logic executed by the one or more processors for receiving a pull request to read at least one content item from at least one content writer in a content reader's pull list of writers;
      receiving logic executed by the one or more processors for receiving a request for display of a combination of a subset of the provided content items from the push cache and from at least another content item pulled in response to the received pull request, the combination being a blended display result;
      employing logic executed by the one or more processors for employing a cost model personalized for the content reader to determine each writer of a content item that is included in the blended display result and to modify the push list of writers and pull list of writers by moving the at least one determined writer from one of the push list or pull list to the other of the pull list or the push list, wherein the personalized cost model is further employed to make a determination to move a content writer from the pull list to the push list if a similarity of content between the writer's content item and a content reader's profile is above a defined threshold; and
      providing logic executed by the one or more processors for providing information to the at least one determined writer based on the personalized cost model indicating that the writer is to push a content item for the content reader.

15. The system of claim 14, the stored program logic further comprising:
   determining logic executed by the one or more processors for determining an estimated rate of a first writer's content item is in a defined number of previous blended display results;
   determining logic executed by the one or more processors for determining an estimated rate of a second writer's content item is in a defined number of previous blended display results;
   determining logic executed by the one or more processors for determining an estimated rate that the first writer produces a new content item;
   determining logic executed by the one or more processors for determining an estimated rate that the second writer produces a new content item;
   when the first writer is determined to be in the content reader's pull list, the stored program logic comprising:
      using logic executed by the one or more processors for using the personalized cost model to compute a first cost saving based on a ratio of the estimated rate that the first writer's content ends up in blended display results for the content reader to the estimated rate that the first writer produces a new content item;
      using logic executed by the one or more processors for using the personalized cost model to compute a second cost saving based on a ratio of the estimated rate that the second writer's content ends up in blended display results for the content reader to the estimated rate that the second writer produces a new content item; and
      placing logic executed by the one or more processors for placing logic executed by the one or more processors for placing, if the second cost saving is greater than first cost saving, the second writer into the push list and the first writer into the pull list.

16. The system of claim 14, the stored program logic further comprising:
   determining logic executed by the one or more processors for determining, for each writer in the pull list that has a content item identified k times in a previous m number of blended display results, whether the writer last provided a content item having a timestamp tw that is older than an oldest timestamp in the previous number of blended display results for j less than or equal to k, and if it is move the writer into the push list.

17. The system of claim 14, the stored program logic further comprising:
   determining logic executed by the one or more processors for determining whether a writer in a push list is a popular writer based in part on a number of other content readers to which the writer is to push content items; and
   allowing logic executed by the one or more processors for allowing, if the writer is determined to be a popular writer, the writer to push a content item to a shared cache useable by the plurality of different content readers.

18. The system of claim 14, the stored program logic further comprising:
   determining logic executed by the one or more processors for determining, for a writer not having a content item in the content reader's push cache but having a content item k times in a previous m number of blended display results, whether the writer last provided a content item having a timestamp tw that is older than an oldest timestamp in the previous j number of blended display results for j less than or equal to k, and if it is move the writer into the push list.

19. The system of claim 14, the stored program logic further comprising:
    determining logic executed by the one or more processors for determining whether a writer in a push list is a popular writer based in part on a number of other content readers to which the writer is to push content items; and
    using logic executed by the one or more processors for using, if the writer is determined to be a popular writer, a multicast protocol to push the content item of the writer to the plurality of different content readers.

20. The system of claim 14, the at least one computing device comprising one of a client device or a network server device remote from a client device.

* * * * *